United States Patent [19]

Liggins et al.

[11] Patent Number: 4,796,923
[45] Date of Patent: Jan. 10, 1989

[54] JOINTS FOR TUBULAR MEMBERS

[75] Inventors: Brian D. Liggins, Kettering; Timothy S. Round, Gretton; Stuart J. Welch, Burton Latimer; Gordon F. Reynolds, Corby, all of England

[73] Assignee: British Steel Corporation, United Kingdom

[21] Appl. No.: 76,029

[22] Filed: Jul. 21, 1987

[30] Foreign Application Priority Data

Jul. 22, 1986 [GB] United Kingdom ................. 8617827

[51] Int. Cl.⁴ .............................................. F16L 15/00
[52] U.S. Cl. ..................................... 285/27; 285/175; 285/334
[58] Field of Search .................. 285/27, 334, 333, 175

[56] References Cited

U.S. PATENT DOCUMENTS

| | | | |
|---|---|---|---|
| 1,637,628 | 8/1927 | Weisgerber | 285/334 X |
| 1,973,848 | 9/1934 | Duffy | 285/333 |
| 2,587,544 | 2/1952 | Sneddon | 285/333 |
| 3,917,321 | 11/1975 | Rodgers | 285/334 X |
| 4,429,904 | 2/1984 | Reimert | 285/27 X |
| 4,522,431 | 6/1985 | Reimert | 285/27 |
| 4,537,429 | 8/1985 | Landriault | 285/334 |
| 4,601,491 | 7/1986 | Bell, Jr. et al. | 285/24 |

FOREIGN PATENT DOCUMENTS

WO84/04352 11/1984 PCT Int'l Appl. .

Primary Examiner—Thomas F. Callaghan
Attorney, Agent, or Firm—Kinney & Lange

[57] ABSTRACT

The invention provides a joint between two tubes comprising a box at one end of one tube and a pin at one end of the other tube, the pin being provided on its external surface with a threadless zone at its nose serving as a stabbing guide for entry of the pin into the box, a parallel threaded load carrying zone, and an inclined threaded locking and load carrying zone; the box being provided on its inner surface with a parallel threaded load carrying zone, and an inclined threaded locking and load carrying zone, both generally matching and engageable with the corresponding zones of the pin, and an unthreaded stabbing guide zone axially disposed between said parallel load carrying zone and said inclined locking and load carrying zone of the box; the parallel load carrying zone in the box serving as an extension of the stabbing guide provided between the parallel load carrying zone and the inclined locking and load carrying zone for the nose of the pin, and the two threaded zones in the box being so separated that the parallel threaded load carrying zone engages with the corresponding threaded zone on the pin firstly on make-up of the joint.

7 Claims, 4 Drawing Sheets

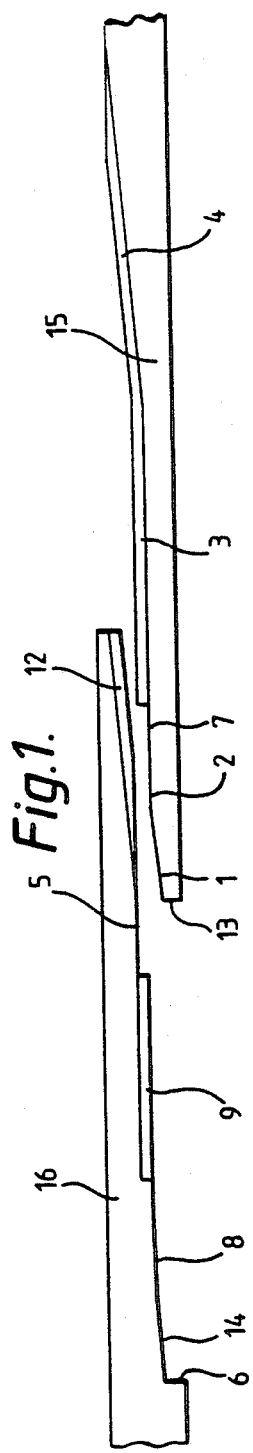
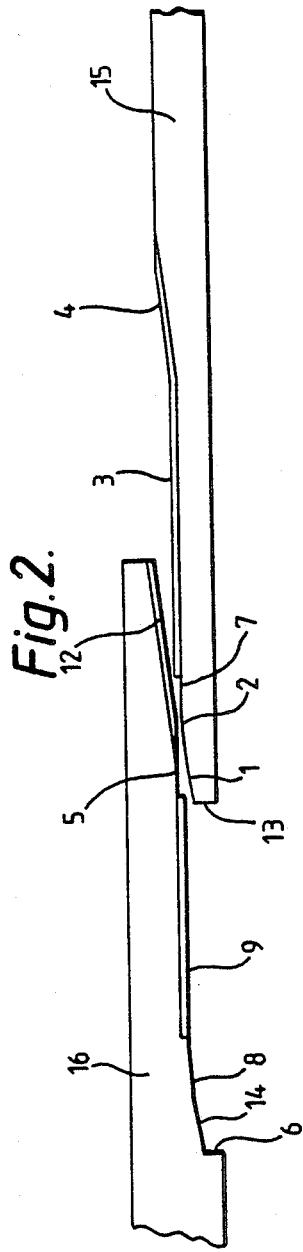
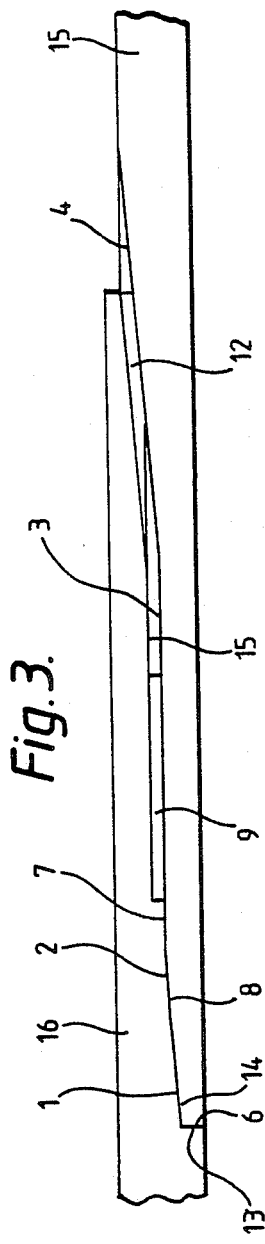

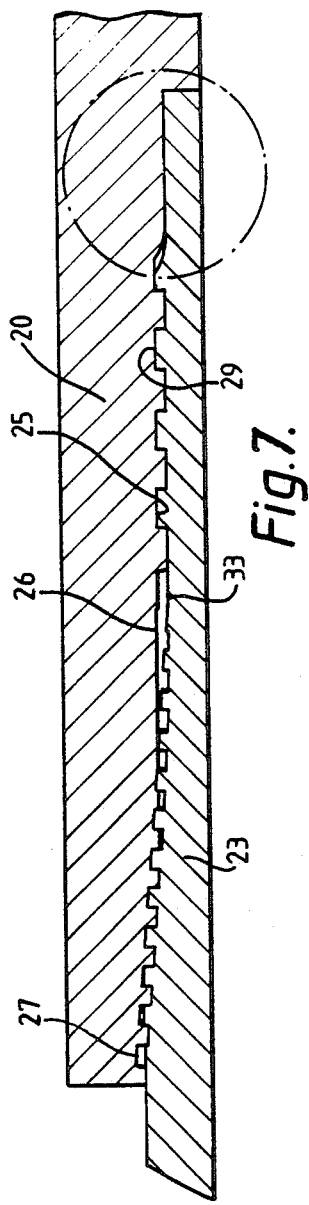
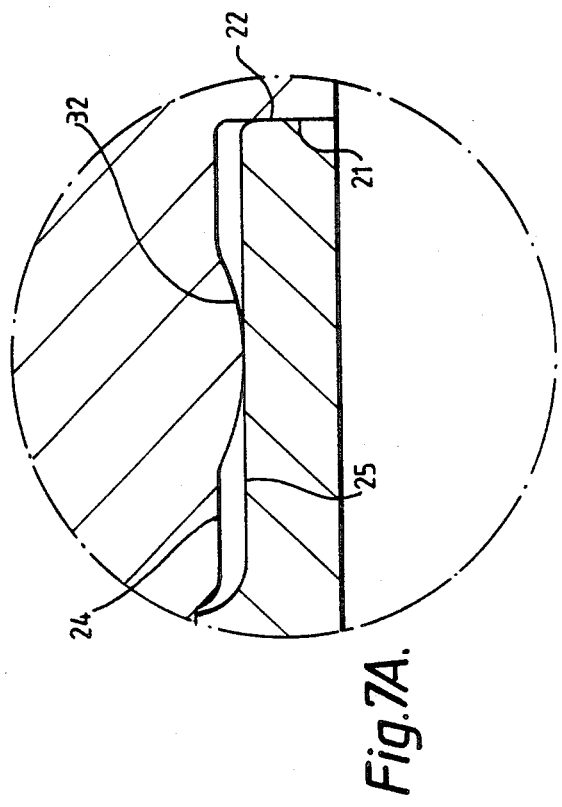
Fig.7.
Fig.7A.

JOINTS FOR TUBULAR MEMBERS

BACKGROUND OF THE INVENTION

1. Field of the Invention

This invention relates to joints for tubular members, and, more particularly, to joints for tubular members for the oil industry, such as tubing, casing and drill pipe, (hereinafter simply called "tubes" for convenience).

2. Description of the Prior Art

Commonly joints for these tubes are of spigot (or pin) and socket (or box) type, in which the socket is formed either from one end of each tube after enlargement (upsetting) and opening out, or from a short coupler, of larger diameter than the tubes, provided with a socket at each end. The connection is usually by screw threads of various configuration cut upon the spigot and within the socket, connection being made by "stabbing" the pin into the box and then rotating the pin relative to the box.

Sealing may be by means of a variety of metal to metal arrangements or by seal inserts or coatings. The tubes, and the joints, are usually formed of steel.

Such tubes often require to be connected into vertical strings of many thousands of feet which repeatedly have to be connected, and successively passed down a drill hole, and then subsequently removed therefrom and successively disconnected again during the exploration for and exploitation of oil or gas from the deep wells commonly encountered.

Such repeated connection and disconnection of the joints can cause considerable wear and tear to the joints, and the liability of damage to the threads by jamming and/or cross-threading, and damage to sealing surfaces of such joints.

Such damage can lead to reduced life of the tube before it requires re-preparation, on a shorter length, of the joint at each end, and a new coupler (if such is used), and can also lead to operational difficulties with respect to the connection and disconnection of the tubes themselves. Again such damage can, in the case of damage to the primary seal mechanism, result in oil or gas leakage through the joint which can be of serious environmental significance. Yet again any such damage resulting in a defect in the bore of the tube adjacent to the joint connection can lead to a corrosion weak spot with respect to the oil or gas product flowing therethrough, which can in due course significantly increase the damage to the joint.

It is an object of the present invention to provide a joint for oil and gas industry tubes which overcomes or at least substantially reduces the abovementioned disadvantages and difficulties.

SUMMARY OF THE INVENTION

In accordance with one aspect of the invention there is provided a joint between two tubes comprising a box at one end of one tube and a pin at one end of the other tube, the pin being provided on its external surface with an inclined threadless zone at its nose serving as a stabbing guide for entry of the pin into the box, and an inclined or parallel threaded zone; and the box being provided on its inner surface with an inclined or parallel threaded zone generally matching and engageable with the corresponding zone of the pin, and axially outwardly thereof an inclined or parallel sided unthreaded stabbing guide zone.

The threaded zones may incorporate tapered threading.

It is to be understood that the words "inclined", "tapered" and "parallel" as used herein are with respect to the axis of the joint. In addition, it is to be understood that the word "parallel" includes nominally parallel and approximately parallel, that the word "inclined" means, with respect to the pin, inclined radially inwardly towards the nose thereof and, with respect to the box, inclined radially inwardly towards the axially inward part of the box; and that the word "tapered" means, with respect to thread on the pin, reducing in height away from the nose, and, with respect to thread in the box, reducing in height towards the outer end thereof.

In accordance with another aspect of the present invention there is provided a joint between two tubes comprising a box at one end of one tube and a pin at one end of the other tube, the pin being provided on its external surface with a threadless zone at its nose serving as a stabbing guide for entry of the pin into the box, a parallel threaded load carrying zone, and a inclined threaded locking and load carrying zone; the box being provided on its inner surface with a parallel threaded load carrying zone, and an inclined threaded locking and load carrying zone, both generally matching and engageable with the corresponding zones of the pin, and an unthreaded stabbing guide zone axially disposed between said parallel load carrying zone and said inclined locking and load carrying zone of the box; the parallel load carrying zone in the box serving as an extension of the stabbing guide provided between the parallel load carrying zone and the inclined locking and load carrying zone for the nose of the pin, and the two threaded zones in the box being so separated that the parallel threaded load carrying zone engages with the corresponding threaded zone on the pin firstly on make-up of the joint.

The parallel threaded load carrying zone of the box may be disposed axially inwardly of the inclined locking and load carrying threaded zone thereof, although in the alternative the parallel threaded zone may be disposed axially outwardly of the inclined threaded zone, in which case an additional axially outward inclined zone may be provided in the box. The threaded zones of the pin are located to correspond.

The inclined locking and load carrying threaded zones of the pin and box may comprise double start threads, and the parallel threaded locking and load carrying zones may comprise single start threads of twice the axial length, in crest and trough, as the double start threads.

The pin may be provided, between and separating the threaded zones aforementioned, with an unthreaded portion corresponding generally to that of the unthreaded stabbing guide zone in the box disposed between the parallel load carrying zone and the inclined locking and load carrying zone thereof.

The box may be provided, inwardly of its axially inmost threaded zone with an inmost threadless zone, metal-to-metal sealing being provided by radial interference between the threadless zone at the nose of the pin and the inmost threadless zone of the box.

Metal-to-metal sealing of the connection may be provided by means of a radiused annular projection on the nose of the pin engaging with a cylindrical portion in the box, or vice-versa. Alternatively it may be provided by means of radial interference between sealing zones provided by mating unthreaded inclined zones of both the pin and the box between the threaded load bearing zone and the inclined stabbing guide zone or between the load bearing and locking threads of each. Alternatively, sealing may be provided by means of a resilient ring carried by the pin or box and engageable with a surface of the box or pin respectively in a sealing manner. Such seals could be carried at a shoulder within the box engageable with the end of the pin or could be inserted elsewhere, such as in a groove in a threaded portion of the pin. A seal can also be provided in addition to, or in an alternative to, a metal-to-metal seal, by means of a sealing compound incorporated in the threading.

The threading utilised in the arrangement of the invention may be of general buttress form in which the flanks thereof are usually of normal positive angle, although a reverse angle load flank can be utilised in certain circumstances. In practice the threads can vary in pitch, in configuration and in magnitude along the load carrying and locking thread zones to provide the elastic and plastic strain necessary to produce the required strain energy distribution in the joint. With large diameter tubes and joints, e.g. of 20 inches, the thread may be deeper in configuration than is normal in the industry to allow for radial movement in joints of this size.

The box may be incorporated in a separate coupler element connected between two pin ends of tubes, although in an alternative arrangement, the box may be provided in a specially prepared and upset end of a tube to provide an integral box end therefor.

The box and pin elements of the joint may be incorporated in separate rings which may subsequently be attached to the ends of lengths of pipe by welding.

BRIEF DESCRIPTION OF THE DRAWINGS

In order that the invention may be more readily understood two embodiments thereof will now be described by way of example with reference to the accompanying drawings in which:

FIGS. 1 to 3 illustrate schematically and in section one half of the pin and box in three successive positions of engagement between a tube and a coupler element of a joint according to a first embodiment of the invention;

FIG. 7 and 7A show the arrangement of FIG. 6 fully engaged and, in enlargement, a sealing arrangement therefor.

DETAILED DESCRIPTION OF THE PREFERRED EMBODIMENT

Figure 4:
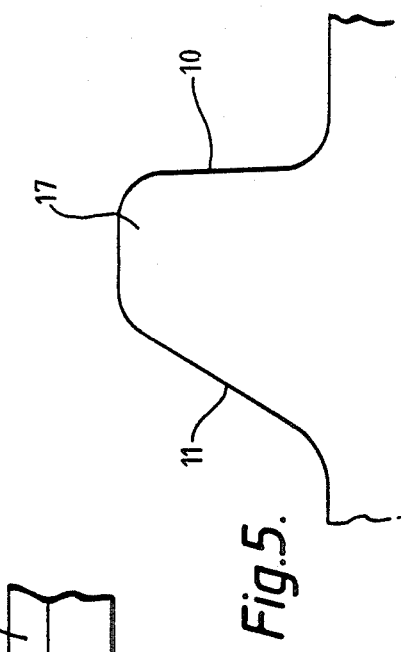
FIG. 4 is an enlargement of the nose of the pin of FIGS. 1 to 3.
Figure 5:
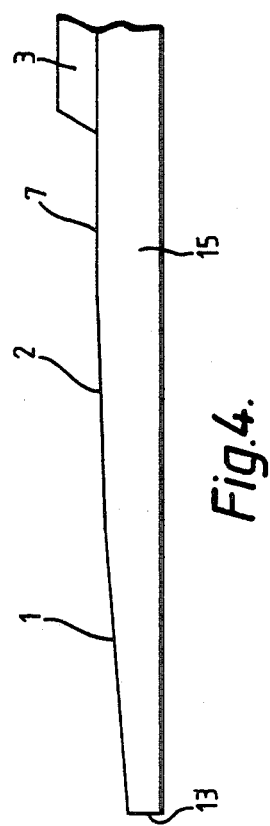
FIG. 5 illustrates a typical buttress thread utilised in the arrangement of FIGS. 1 to 4.

Referring now to FIGS. 1 to 5 of the drawings it will be seen that the pin 15 and box 16 can best be described in relation to the zones previously mentioned hereabove.

Zone 1 of the pin is an inclined area which engages initially as a stabbing guide and serves also as a damage control zone. It is to be observed that this zone can suffer distortion without jeopardizing joint performance. A corresponding unthreaded inclined zone 14 is provided in the box.

Zone 2 on the pin and zone 8 in the box are zones for sealing by radial interference between the pin and box areas. Sealing is achieved by constant radial strain, irrespective of joint diameter.

Zone 3 on the pin and zone 9 in the box comprise an area of load carrying thread. Typically, with a 20" diameter joint, a parallel thread of one and a half to two turns per inch single start, or three to four profiles per inch if a double start is provided. As previously mentioned the thread form 17 is of the buttress type, seen in FIG. 5, having an upright load bearing flank 10, and a positively tapered opposite, stabbing flank 11.

Zone 4 on the pin and zone 12 in the box are inclined and possibly tapered thread sections, again of buttress type of a pitch matching the number of turns per inch of zones 3 and 9, giving radial interference between the two sets of threads on makeup to provide adequate frictional resistance to any breakout of the joint.

It is to be noted that the box has a threadless zone 5 between the zone 9 and zone 12. This comprises a stabbing guide of considerable significance in the box and consists a parallel smooth bore closely matching the outside diameter of the pin parallel thread zone 3. It is of course to be noted that the parallel and inclined threads of zones 9 and 12 on either side of the stabbing guide zone 5 in the box must be maintained in pitch to ensure satisfactory makeup.

A shoulder 6 is provided at the end of the box which on full makeup engages the pin end 13 as shown in FIG. 3. The shoulder and pin end absorb makeup energy and limit the axial makeup position.

Zone 7 of the pin between the sealing zone 2 and the parallel thread zone 3 is a further portion of stabbing guide of parallel smooth wall. It is to be observed that this has the effect of elongating the end of the pin at the portion thereof initially stabbing into the box prior to engagement of threads (as shown in FIG. 2) and thereby reduces the possibility of angular distortion so as to reduce the risk of cross-threading and jamming.

It is to be observed that Zone 5 of the box is perhaps the most crucial of all of the zones in relation to the stabbing performance of the joint. It is intended to make the initial contact on introduction of the pin between Zone 1 of the stabbing guide on the pin (again as shown in FIG. 2) and is capable, together with the stabbing guide zone 1, of taking limited damage during makeup without thereby causing any damage to the internal surfaces of the connected tube, or to the threads of the connection, or to the sealing zone (all of which is most important in practical terms).

Zone 7 of the pin is also of some considerable importance in makeup since this will engage upon further insertion of the pin with Zone 5. Crossthreading is avoided in makeup because of the length and dimensions and configurations of Zones 1, 2, 3, 5 and 7 of the pin.

It is to be noted that makeup of the joint can be assisted by the use of a double-start threading arrangement which is easily provided in the joint of the present invention.

Whilst in practice Zones 3 and 4 of the pin will, for convenience, probably merge with one another, there is no technical necessity for this to be so, and they can if desired, and for convenience in manufacture be separated from one another.

In one embodiment frusto-conical interference between zones 1 and 14 provides sealing. In this case the seal zone angle of both pin and box are in the range 2°–4° with respect to the axis of the connection. It is to be noted that essentially the angle of zone 1 with respect to the axis of the connection is essentially greater than the angle of the sealing zone both of the pin and the box. The angle of zone 14 may be a continuation of the angle of zone 8 or lie between this angle and the angle of zone 1 of the pin, thereby leaving clearance between the adjacent surfaces of zone 1 of the pin and zone 14 of the coupling to accommodate minor distortion due to damage arising from the stabbing operation. Zone 4 and 12, the tapering load and locking thread zones, on the pin and in the box will have an angle sufficient to retain the joint locked when assembled with the required radial interference. Typically this will be an angle within the range 1°–4° to the axis of the connection.

The angles of the various zones to the axis of the connection, and the elastic and plastic strain provided in the threading will be chosen such that the seal between the respective sealing zones 8 and 2 of the box and pin is maintained, whilst galling (i.e. local welding) of the sealing surface is avoided. Such a requirement obviously is applied to the locking zones 4 and 12.

Over any desired design diameter range, constant strain may be maintained in the seal zones 2 and 8 and constant strain, which may be of a different value, in the load and locking thread zones 4 and 12. The purpose of such constancy is to ensure similar performance over a total diameter range in terms of seal performance and anti-galling characteristics.

Instead of using a separate coupler between two tubes having pin ends, an integral joint can be utilised using an upset, or welded on, box at one end of each tube.

In practice with the arrangement illustrated, the pin is approached into the box as shown in FIG. 1. Should, as often is the case, the pin be offset or inclined relative to the box, the stabbing guide zone 1 will initially contact box stabbing guide zone 5 (as shown in FIG. 2) or inclined threaded zone 12 which, absorbing any damage therefrom, turns the pin into greater alignment with the box. As the pin progresses into the box, the alignment is progressively improved by inter-action of the stabbing guide zone 7 of the pin with the guide zone 5 or 12 of the box, until, prior to engagement of threaded zones 3 and 9, there is full alignment, thereby preventing crossed or damaged threads. The pin is then rotated within the box until full make-up has been achieved as shown in FIG. 3.

Figure 6:
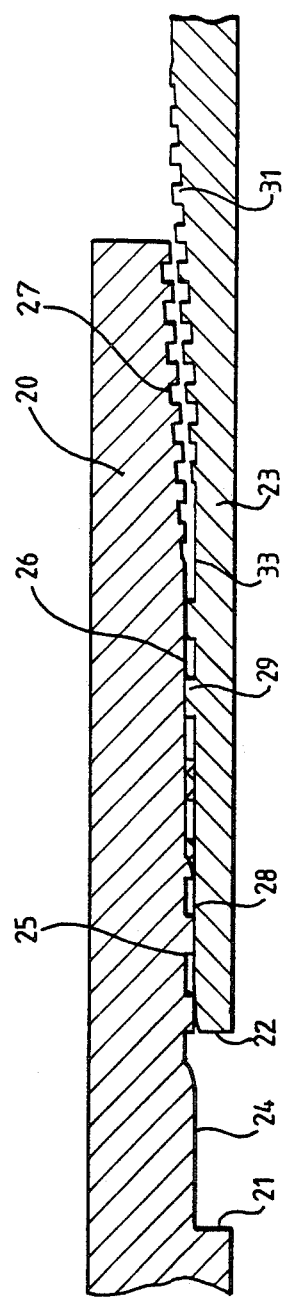
FIG. 6 is a schematic sectional elevation of half the pin and box in stabbing engagement of a second embodiment of a joint of the invention.
Figure 8:
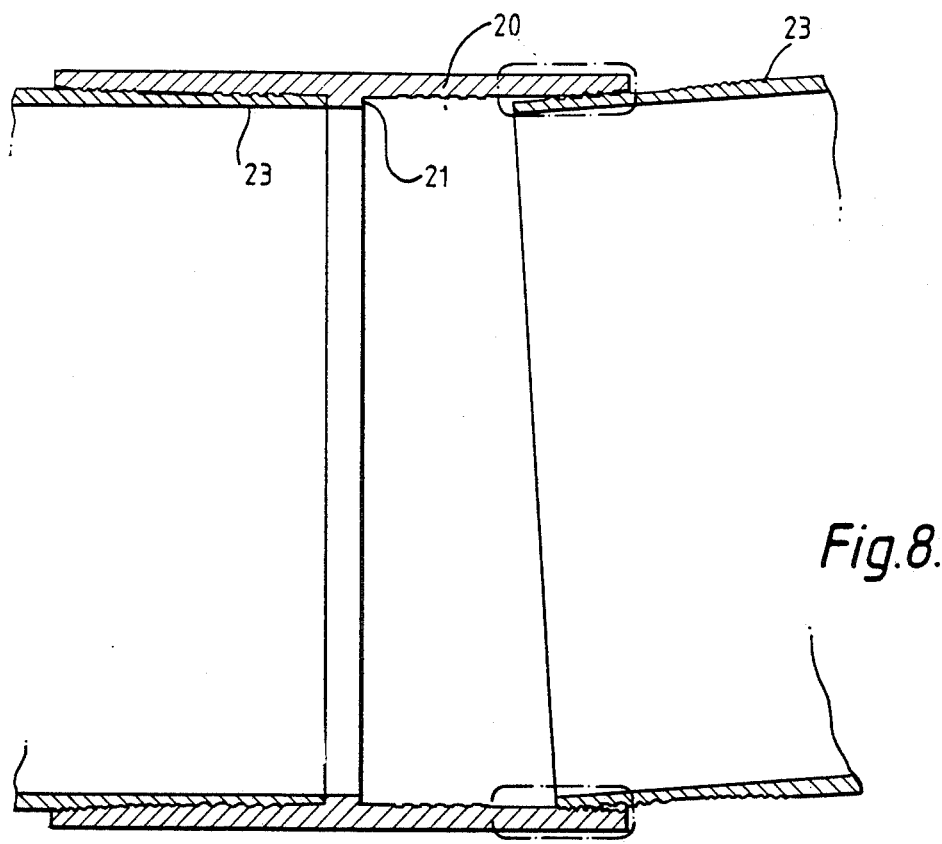
FIGS. 8, 8A, 8B shows the facility of the arrangement of FIGS. 6 to 7 for accommodating misalignment at stabbing.

Referring now to FIGS. 6 to 8, the second embodiment of the joint according to the invention illustrated is similar in general arrangement to that of FIGS. 1 to 5.

As can be seen from FIG. 6 the box 20 has, at its innermost end, a right-angled shoulder contact surface 21 adapted to meet an equivalent right-angled contact surface 22 at the end of a pin 23. This shoulder contact serves as a positive stop on make up to prevent over-wrenching and to provide some axially compressive pre-load in the pin nose to limit axial movement of the seal under high tensile loading. Axially outwardly of the surface 21 in the box is an unthreaded zone for sealing purposes 24, followed by a short parallel threaded load carrying zone of single start thread 25 (as can be clearly seen in FIGS. 6 and 7). Axially outwardly thereof is a parallel unthreaded stabbing guide zone 26, and then an inclined and tapered locking and load bearing threaded zone 27.

The pin has a stabbing guide of unthreaded form 28 followed by a single start threaded parallel load carrying zone 29, which in turn is separated by a parallel threadless zone 33 from an inclined tapered locking and load bearing double start threaded zone 31.

Sealing is by means of metal-to-metal contact at the nose of the pin 28. As can be seen in FIG. 7A the nose of the pin 28 may be of cylindrical form which mates with a matching radius portion 32 formed around the inside of the corresponding parallel portion 24 of the box. It will be appreciated that a similar arrangement could be made but with the radius portion provided on the pin and the cylindrical portion on the box. Again as indicated in FIGS. 1 to 5, a straightforward tapered or frusto-conical radial seal can be provided.

The threads may be of the form illustrated with respect to the embodiment of FIGS. 1 to 5.

Figure 8A:
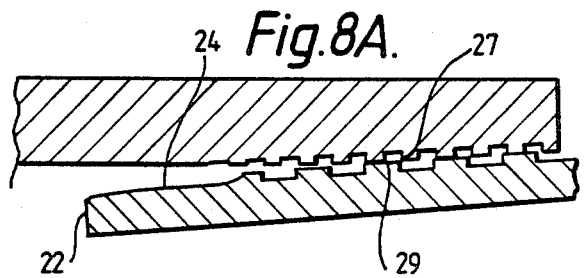
Figure 8B:
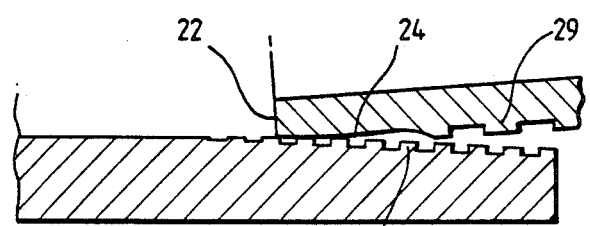

It is to be noted that the stabbing nose 28 of the pin 23 is capable of absorbing damage which will not detrimentally affect the joint's performance in any way. The usefulness of this in make-up with misalignment is illustrated clearly in FIGS. 8, 8A and 8B, where a four degree misalignment is illustrated which, in the enlarged detail clearly shows an acceptable mating between the pin and the box despite such severe misalignment. The stabbing nose of the pin is intended to protect the metal-to-metal seal and assist in aligning the axis of the pipe joint to that of the coupling on initial presentation.

The stabbing performance of the arrangement of FIGS. 6 to 8 is in particular enhanced by two feature arrangements:

1. The combination of an extensive unthreaded central zone in the box together with an initial parallel threaded section on the pin end; and 2. the utilisation of a large single start thread on the parallel section together with a double start taper thread of the same pitch and of half the width of crest and trough.

On initial entry of the pin into the box, the stabbing nose protects the metal-to-metal seal as described above. As penetration continues, the parallel threads, being larger than the taper threads, do not interfere with the stabbing action or engage with the taper teeth as might be the case if both taper and parallel tooth sizes were the same. The design is such that the radial and angular axial alignment of the pin and box threads is improved with penetration of the pin into the box. By the time the position shown in FIG. 6 is reached, with the parallel threads fully engaged in the unthreaded box centralising section, the pin and box threads are very closely aligned. The size of the parallel pin threads means that they are less prone to damage during this operation. The joint is then ready to be screwed together.

It is important that the parallel thread engages before the inclined threads. At this stage, the metal-to-metal seal is not in contact with any other part.

As wrenching proceeds, the pin moves axially into the box and causes engagement of the inclined threads, followed by engagement of the metal-to-metal seal. After a few turns (probably two or three), the taper thread on the pin begins to interfere with that on the box. After a small amount of further rotation (probably less than one turn), the strain energy required to keep the joint together under operational conditions has been applied and the internal pin and box shoulders (normally 90°) come into contact. Further torque is applied to compressively preload the pin seal area to a predetermined degree.

Another advantage of the arrangement illustrated is that with normal taper thread previously used of large size, such as 20 inches in outside diameter, accurate stabbing is required. Angular misalignment of the axis of less than 1° may result in cross-threading of the joint which would be difficult in field operation to identify. By means of the arrangement described above, the joint illustrated can tolerate, as has been explained, an angular misalignment of up to 4° even though it is expected that such would only be experienced during operations in high winds etc.

Again, although it has previously been proposed by others to use a bigger taper thread this does, we believe, lead to severe problems with thread galling on large sizes. The arrangement in accordance with the invention as described above and illustrated hereto minimises galling tendency by minimising the duration of surface rotation occuring in the interfering taper thread by employing a comparatively steep taper angle and by ensuring that both pin and box taper threads are undamaged by the stabbing operation as described above.

By means of the invention we have provided a tube connection for oil industry tubular products to improve stabbing and make-up characteristics leading to more efficient operation.

We claim:

1. A joint between two tubes comprising a box at one end of one tube and a pin at one end of the other tube, the pin being provided on its external surface with a threadless zone at its nose serving as a stabbing guide for entry of the pin into the box, a parallel threaded load carrying zone, and an inclined threaded locking and load carrying zone; the box being provided on its inner surface with a parallel threaded load carrying zone, and an inclined threaded locking and load carrying zone, both generally matching and engageable with the corresponding zones of the pin, and an unthreaded stabbing guide zone axially disposed between said parallel load carrying zone and said inclined locking and load carrying zone of the box; the parallel load carrying zone in the box serving as an extension of the stabbing guide provided between the parallel load carrying zone and the inclined locking and load carrying zone for the nose of the pin, and two threaded zones in the box being so separated that the parallel threaded load carrying zone engages with the corresponding threaded zone on the pin firstly on make-up of the joint; the inclined locking and load carrying threaded zones of the pin and box comprising double start threads and the parallel load carrying zones of the pin and box comprising single start threads.

2. A joint as claimed in claim 1 wherein the parallel threaded load carrying zone of the box is disposed axially inwardly of the inclined locking and load carrying threaded zone thereof.

3. A joint as claimed in claim 1 wherein the single start threaded zones are of twice the axial length in crest and trough as the double start threads of the inclined locking and load carrying threaded zone.

4. A joint as claimed in claim 1 wherein the pin is provided between and separating the threaded zones aforementioned with an unthreaded portion corresponding generally in location to that of the unthreaded stabbing guide zone in the box disposed between the parallel load carrying zone and the inclined locking and load carrying zone.

5. A joint as claimed in claim 2 wherein the box is provided inwardly of its axially inmost threaded zone with an inmost threadless zone.

6. A joint as claimed in claim 5 wherein metal-to-metal seal is provided by means of radial interference between threadless zone of the nose of the pin and the corresponding threadless zone within the box.

7. A joint between two tubes comprising a box at one end of one tube and a pin at one end of the other tube, the pin being provided on its external surface with a threadless zone at its nose serving as a stabbing guide for entry of the pin into the box, a parallel threaded load carrying zone, and an inclined threaded locking and load carrying zone; the box being provided on its inner surface with a parallel threaded load carrying zone, and an inclined threaded locking and load carrying zone, both generally matching and engageable with the corresponding zones of the pin, and an unthreaded stabbing guide zone axially disposed between said parallel load carrying zone and said inclined locking and load carrying zone of the box; the parallel load carrying zone in the box serving as an extension of the stabbing guide provided between the parallel load carrying zone and the inclined locking and load carrying zone for the nose of the pin, and the two threaded zones in the box being so separated that the parallel threaded load carrying zone engages with the corresponding threaded zone on the pin firstly on make-up of the joint; the inclined locking and load carrying threaded zones of the pin and box comprising twice the number of start threads as the parallel load carrying zones of the pin and box.

* * * * *

UNITED STATES PATENT AND TRADEMARK OFFICE
CERTIFICATE OF CORRECTION

PATENT NO. : 4,796,923

DATED : January 10, 1989

INVENTOR(S) : Brian D. Liggins

It is certified that error appears in the above-identified patent and that said Letters Patent is hereby corrected as shown below:

Column 8, line 19, after "claim", delete "2", insert "1"

Signed and Sealed this

Nineteenth Day of September, 1989

Attest:

DONALD J. QUIGG

Attesting Officer

Commissioner of Patents and Trademarks